US009505891B2

(12) United States Patent
Daimon et al.

(10) Patent No.: US 9,505,891 B2
(45) Date of Patent: Nov. 29, 2016

(54) RESIN COMPOSITION, FRICTION MATERIAL, AND METHOD FOR PRODUCING SAME

(71) Applicant: OTSUKA CHEMICAL CO., LTD., Osaka-shi, Osaka (JP)

(72) Inventors: Emiko Daimon, Tokushima (JP); Takuya Nomoto, Tokushima (JP)

(73) Assignee: OTSUKA CHEMICAL CO., LTD., Osaka-shi, Osaka (JP)

( * ) Notice: Subject to any disclaimer, the term of this patent is extended or adjusted under 35 U.S.C. 154(b) by 0 days.

(21) Appl. No.: 14/780,422

(22) PCT Filed: Mar. 12, 2014

(86) PCT No.: PCT/JP2014/056502
§ 371 (c)(1),
(2) Date: Sep. 25, 2015

(87) PCT Pub. No.: WO2014/156654
PCT Pub. Date: Oct. 2, 2014

(65) Prior Publication Data
US 2016/0046772 A1   Feb. 18, 2016

(30) Foreign Application Priority Data
Mar. 27, 2013 (JP) ................. 2013-065577

(51) Int. Cl.
*C08G 63/00* (2006.01)
*C08J 5/00* (2006.01)
*C08L 61/06* (2006.01)
*F16D 69/02* (2006.01)
*C08J 3/21* (2006.01)
*C08K 3/22* (2006.01)

(52) U.S. Cl.
CPC ........ *C08J 5/00* (2013.01); *C08J 3/212* (2013.01); *C08K 3/22* (2013.01); *C08L 61/06* (2013.01); *F16D 69/025* (2013.01); *C08J 2300/24* (2013.01); *C08J 2361/06* (2013.01); *C08J 2361/14* (2013.01); *F16D 2200/0069* (2013.01)

(58) Field of Classification Search
CPC .................................................. C08G 65/485
USPC ............................... 528/308.8, 354; 525/390
See application file for complete search history.

(56) References Cited

U.S. PATENT DOCUMENTS

| 2003/0147804 A1 | 8/2003 | Ogawa et al. |
| 2007/0003463 A1* | 1/2007 | Ajiri ............... B01J 3/006 423/274 |
| 2007/0219289 A1 | 9/2007 | Phipps et al. |
| 2014/0202805 A1 | 7/2014 | Unno et al. |

FOREIGN PATENT DOCUMENTS

| CN | 1444544 A | 9/2003 | |
| CN | 101177490 A | 5/2008 | |
| CN | 101250271 A | 8/2008 | |
| CN | 102794912 A | 11/2012 | |
| DK | DE 2143011 * | 2/1974 | ........... C08G 59/68 |
| JP | 10-130629 A | 5/1998 | |
| JP | 2007-126600 A | 5/2007 | |
| JP | 2010-235730 A | 10/2010 | |
| JP | 2012-255051 A | 12/2012 | |
| JP | 2012-255053 A | 12/2012 | |

OTHER PUBLICATIONS

International Search Report dated Jun. 10, 2014, issued in counterpart application No. PCT/JP2014/056502 (1 page).
International Preliminary Report on Patentability dated Sep. 29, 2015, issued in counterpart application No. PCT/JP2014/056502 (2 pages).
Written Opinion of the International Searching Authority dated Oct. 6, 2014, issued in counterpart application No. PCT/JP2014/056502, (5 pages).
Extended (supplementary) European Search Report dated Sep. 27, 2016, issued in counterpart Application No. 14773326.5. (8 pages).
Office Action dated Sep. 12, 2016, issued in counterpart Chinese Application No. 201480017933.X. (7 pages).

* cited by examiner

*Primary Examiner* — Terressa Boykin
(74) *Attorney, Agent, or Firm* — Westerman, Hattori, Daniels & Adrian, LLP

(57) ABSTRACT

Provided are: a resin composition that can be given excellent formability and wear resistance when used as a friction material or the like; and a method for producing the resin compound. A titanate compound, which is a salt of at least one element selected from the group consisting of alkali metals and alkaline earth metals, is dispersively contained in a thermosetting resin prior to curing.

12 Claims, No Drawings

RESIN COMPOSITION, FRICTION MATERIAL, AND METHOD FOR PRODUCING SAME

TECHNICAL FIELD

This invention relates to resin compositions, friction materials, and methods for producing them.

BACKGROUND ART

For friction materials, such as brake pads, brake linings, and clutch facings for various vehicles and industrial machines, mixtures obtained by dry-mixing a binder such as a thermosetting resin, an inorganic filler such as a titanate compound, an organic filler, and so on are conventionally used. Such a mixture is formed into a shape at a predetermined pressure and normal temperature, then thermoformed at a predetermined temperature, and then subjected to thermal treatment and finishing, resulting in a formed body of a friction material or so on.

As the titanate compound, alkali metal titanates represented by a general formula $M_2O \cdot nTiO_2$ (where M is an alkali metal element) are used. Because, however, alkali metal titanates in which n=2 to 4 have a lamellar crystal structure, their interlamellar alkali component may be eluted during formation of a friction material, thus deteriorating the matrix resin of the friction material. On the other hand, alkali metal titanates in which n≥6 cause less elution of an alkali component but have insufficient wear resistance.

Patent Literature 1 discloses that the elution of an alkali component contributes to the formation of a friction film and a transfer film at the frictional interface. In view of this, Patent Literature 1 proposes to use an amorphous alkali metal titanate and a crystalline alkali metal titanate of n≥6 in combination and allow a suitable amount of alkali component to be eluted by wear failure, softening, melting, and so on of the alkali metal titanates due to friction, thus improving the wear resistance. Patent Literature 2 proposes to coat the surface of an inorganic filler with phenolic resin to improve the wear resistance.

CITATION LIST

Patent Literature

Patent Literature 1: JP-A-2010-235730
Patent Literature 2: JP-A-2007-126600

SUMMARY OF INVENTION

Technical Problem

As resin compositions for friction materials, resin compositions having greater wear resistance and resin compositions having good formability are needed. However, Patent Literature 1 has a problem in that alkaline elution to the frictional interface is inefficient because of the combination of titanate compounds having different effects. Patent Literature 2 has a problem in that because the inorganic filler is coated with phenolic resin by preparing the phenolic resin and then dissolving it in a solvent, a large quantity of solvent needs to be used and the number of production processes increases.

An object of the present invention is to provide: a resin composition that can be given excellent formability and wear resistance when used as a friction material or the like; and a method for producing the resin compound.

Solution to Problem

The present invention provides the following resin composition, friction material, and respective methods for producing them.

Aspect 1: A resin composition in which a titanate compound is dispersively contained in a thermosetting resin prior to curing.

Aspect 2: The resin composition according to aspect 1, wherein the thermosetting resin is free from hardener.

Aspect 3: The resin composition according to aspect 1 or 2, wherein the titanate compound has an alkaline elution rate of 2% by mass or more.

Aspect 4: The resin composition according to aspect 1 or 2, wherein the titanate compound has an alkaline elution rate of less than 2% by mass.

Aspect 5: The resin composition according to any one of aspects 1 to 4, wherein the titanate compound is a salt of at least one element selected from the group consisting of alkali metals and alkaline earth metals.

Aspect 6: The resin composition according to any one of aspects 1 to 5, wherein the thermosetting resin is a phenolic resin.

Aspect 7: The resin composition according to any one of aspects 1 to 6, being a resin composition for a friction material.

Aspect 8: A friction material containing the resin composition for a friction material according to aspect 7.

Aspect 9: A method for producing the resin composition according to any one of aspects 1 to 7, the method including the steps of: preparing the thermosetting resin in liquid form; and mixing the titanate compound into the thermosetting resin in liquid form to disperse the titanate compound thereinto.

Aspect 10: The method for producing the resin composition according to aspect 9, wherein the step of preparing the thermosetting resin in liquid form includes the step of liquefying the thermosetting resin by melting the thermosetting resin by application of heat.

Aspect 11: A method for producing the friction material according to aspect 8, the method including the steps of: producing a resin composition by the method according to aspect 9 or 10; adding a hardener to the resin composition, followed by grinding into a ground product; preparing a composition for a friction material using the ground product; and thermoforming the composition for a friction material to produce a friction material.

Advantageous Effects of Invention

The resin composition of the present invention can be given excellent formability and wear resistance when used as a friction material or the like. The friction material of the present invention has excellent formability and wear resistance.

DESCRIPTION OF EMBODIMENTS

Hereinafter, a description will be given of an example of a preferred embodiment for working of the present invention. However, the following embodiment is simply illustrative. The present invention is not at all intended to be limited to the following embodiment.

The resin composition of the present invention is characterized in that a titanate compound is dispersively contained in a thermosetting resin prior to curing. The thermosetting resin prior to curing is preferably free from hardener. If the thermosetting resin prior to curing contains a hardener, the thermosetting resin may cure when melted by the application of heat in order to mix the titanate compound into the thermosetting resin. However, the present invention is not limited to this and the thermosetting resin prior to curing may contain a hardener.

If the alkaline elution rate of the titanate compound is high, the resin composition can be increased in wear resistance when used for a friction material but the friction material is deteriorated. The present invention can eliminate this disadvantage of the titanate compound having a high alkaline elution rate. In other words, the present invention can reduce the deterioration of the friction material caused with the use of any titanate compound having a high alkaline elution rate. Examples of such titanate compounds having a high alkaline elution rate include those having an alkaline elution rate of 2% by mass or more, more preferably those having an alkaline elution rate in a range of 2% to 4% by mass, and still more preferably those having an alkaline elution rate in a range of 2% to 3% by mass. The alkaline elution rate is preferably not more than 4.5% by mass.

In contrast, if the alkaline elution rate of the titanate compound is low, the deterioration of the friction material can be reduced. However, good wear resistance cannot be obtained. The present invention can eliminate this disadvantage of the titanate compound having a low alkaline elution rate. In other words, the present invention can improve the wear resistance. Examples of such titanate compounds having a low alkaline elution rate include those having an alkaline elution rate of less than 2% by mass, more preferably those having an alkaline elution rate in a range of 0.1% to 1.5% by mass, and still more preferably those having an alkaline elution rate in a range of 0.1% to 1% by mass. The alkaline elution rate is preferably not less than 0.1% by mass.

The aqueous dispersion pH of the titanate compound used in the present invention is preferably 7 to 11, more preferably 8 to 10, and still more preferably 9 to 11. When the aqueous dispersion pH of the titanate compound is in the above range, the wear resistance can be prevented from decreasing owing to acidic impurities contained in the titanate compound.

The term alkaline elution rate used in the present invention refers to the percentage by mass of any alkali metal and alkaline earth metal eluted from the titanate compound in water at 80° C. into the water. The alkaline elution rate can be measured with, for example, an ion chromatograph. The term aqueous dispersion pH used in the present invention refers to the pH of a slurry obtained by dispersing a titanate compound into water at 20° C.

The titanate compound used in the present invention is preferably a salt of at least one element selected from the group consisting of alkali metals and alkaline earth metals. Alkali metals include lithium, sodium, potassium, rubidium, cesium, and francium and preferred alkali metals are lithium, sodium, and potassium. Alkaline earth metals include beryllium, magnesium, calcium, strontium, barium, and radium and preferred alkaline earth metals are magnesium and calcium.

Examples of the titanate compound include alkali metal titanates represented by a general formula $M_2O \cdot nTiO_2$ (where M is one or more of alkali metals and n is a number of 4 to 11), alkaline earth metal titanates represented by a general formula $RO \cdot TiO_2$ (where R is one or more of alkaline earth metals), titanate compounds represented by a general formula $M_xA_yTi_{2-y}O_4$ (where M is an alkali metal other than lithium, A is one or more selected from lithium, magnesium, zinc, nickel, copper, iron, aluminum, gallium, and manganese, x is a number of 0.5 to 1.0, and y is a number of 0.25 to 1.0), lepidocrocite-type lithium potassium titanates represented by a general formula $K_{0.5-0.8}Li_{0.27}Ti_{1.73}O_{3.85-4}$, and lepidocrocite-type magnesium potassium titanates represented by a general formula $K_{0.2-0.8}Mg_{0.4}Ti_{1.6}O_{3.7-4}$. Preferred among them are titanate compounds whose crystal structure is a tunnel structure and specific examples thereof include $Na_2Ti_6O_{13}$, $Na_2Ti_8O_{17}$, $K_2Ti_6O_{13}$, $K_2Ti_8O_{17}$, $Li_4Ti_5O_{12}$, $CaTiO_3$, and $MgTO_3$. The tunnel structure can reduce the alkaline elution from the titanate compound.

Possible forms of the titanate compound include fibrous particles and non-fibrous particles, such as spherical, lamellar, platy, prismoidal, blocky, and irregular particles, and non-fibrous forms are preferred from the viewpoint of improving the friction and wear properties. The average particle size is preferably 0.1 to 50 µm, more preferably 1 to 50 µm, and still more preferably 1 to 20 µm. The term average particle size used in the present invention means the particle diameter at 50% cumulative volume in a particle size distribution as determined by the laser diffraction and scattering method.

The thermosetting resin used in the present invention can be an arbitrary one appropriately selected from among known thermosetting resins and examples that can be cited include phenolic resins, formaldehyde resins, melamine resins, epoxy resins, acrylic resins, aromatic polyester resins, and urea resins. Preferred among them are phenolic resins.

Examples of such phenolic resins that can be cited include: resol-type phenolic resins which can be obtained by reacting a phenol with an aldehyde in the presence of a basic catalyst; and novolac-type phenolic resins which can be obtained by reacting a phenol with an aldehyde in the presence of an acidic catalyst. The novolac-type phenolic resins are preferred from the viewpoint of mechanical strength and thermal resistance.

Examples of the phenol that can be cited include: monovalent phenols such as phenol, o-, m- or p-cresol, xylenol, p-tert-butylphenol, α-naphthol, β-naphthol, and p-phenylphenol; divalent phenols such as catechol, resorcinol, 4,4'-dihydroxydiphenylmethane (bisphenol F), and 2,2-bis(4-hydroxyphenyl)propane (bisphenol A); and trivalent or higher polyvalent phenols such as trisphenol compounds and tetraphenol compounds. These phenols may be used alone or in any combination of two or more thereof. Monovalent phenols are preferably used.

Examples of the aldehyde that can be cited include: monoaldehydes such as formaldehyde, acetaldehyde, propionaldehyde, n-butylaldehyde, caproaldehyde, benzaldehyde, phenylacetaldehyde, and o-tolualdehyde; and dialdehydes such as glyoxal. These aldehydes may be used alone or in any combination of two or more thereof. Monoaldehydes are preferably used.

No particular limitation is placed on the reaction molar ratio [F/P] in reacting a phenol (P) with an aldehyde (F) but it is preferably 0.5 to 0.9.

When the reaction molar ratio is within the above range, a novolac-type phenolic resin having a suitable molecular weight can be synthesized without gelation of resin during reaction. If the reaction molar ratio is below the above lower limit, the amount of unreacted phenol contained in the resultant novolac-type phenolic resin may be large. On the other hand, if the reaction molar ratio is over the above upper limit, the novolac-type phenolic resin may gelate depending upon reaction conditions.

Although no particular limitation is placed on the acidic catalyst used, organic acids such as oxalic acid, mineral acids such as hydrochloric acid, sulfuric acid, and phosphoric acid, para-toluenesulfonic acid, and para-phenolsulfonic acid can be used as the acidic catalyst. Although no particular limitation is placed on the amount of the acidic catalyst used, the reaction molar ratio [A/P] in reacting a phenol (P) with a catalyst (A) is preferably 0.001 to 0.2. More preferably, the reaction molar ratio [A/P] is 0.005 to 0.1.

It is sufficient that the content of the titanate compound in the resin composition of the present invention is within a range of 10% to 90% by mass with respect to the total mass of the resin composition. The upper limit of the content of the titanate compound is preferably 90% by mass, more preferably 80% by mass, and still more preferably 70% by mass. The lower limit of the content of the titanate compound is preferably 10% by mass, more preferably 20% by mass, and still more preferably 30% by mass.

The production method of the present invention is characterized by mixing a titanate compound into a thermosetting resin in liquid form to disperse the titanate compound thereinto. Although no particular limitation is placed on the method of mixing a titanate compound into a thermosetting resin in liquid form to disperse the titanate compound thereinto, examples of the method that can be cited include: (1) the method of melting a thermosetting resin by the application of heat and mixing the melted thermosetting resin and a titanate compound together; (2) the method of polymerizing a raw monomer of a thermosetting resin in the presence of a titanate compound; and (3) the method of dissolving a thermosetting resin in a solvent and mixing a titanate compound into the solution. Particularly preferred among them is the method (1). Specific examples that can be cited include: the method of adding a titanate compound to a melted thermosetting resin to mix them; the method of polymerizing a raw monomer of a thermosetting resin and then adding a titanate compound to the thermosetting resin to mix them; the method of adding a melted thermosetting resin to a titanate compound to mix them; the method of grinding a thermosetting resin and a titanate compound individually, dry-mixing them, and then applying heat to them to melt the thermosetting resin; and the method of grinding a thermosetting resin and a titanate compound concurrently, dry-mixing them, and then applying heat to them to melt the thermosetting resin. Regarding the temperature for melting the thermosetting resin by the application of heat, a temperature at which the thermosetting resin has fluidity can be appropriately selected.

Additives or the like which are commonly used heretofore as friction modifiers for friction materials may be blended alone or in any combination of two or more thereof into the resin composition of the present invention without losing desired physical properties of the resin composition. Examples of such friction modifiers that can be cited include an abrasive material, a lubricant, organic dust, metal, and a filler. These modifiers can be blended according to friction properties required for a product, such as coefficient of friction, wear resistance, vibration characteristics, and squeal characteristics.

By curing the resin composition of the present invention, a cured product of a thermosetting resin composition having excellent wear resistance can be obtained. The reason for this is not clear but it can be considered that a more uniform dispersion of the metal titanate compound into the friction material than in known methods improves the wear resistance and that the presence of the metal titanate compound in the thermosetting resin further improves the wear resistance while preventing interference with curing of the thermosetting resin. The curing of the resin composition of the present invention can be implemented by known methods for curing a thermosetting resin, for example, heating process, and a hardener may be used for the curing as necessary. When the thermosetting resin is a novolac-type phenolic resin, hexamethylene tetramine can be used as the hardener. Although no particular limitation is placed on the amount of hexamethylene tetramine used, it is preferably 5 to 20 parts by mass with respect to 100 parts by mass of novolac-type phenolic resin. By limiting the amount of hexamethylene tetramine used within the above range, an excellent cured product, particularly in mechanical strength and wear resistance, can be obtained. For the resin composition of the present invention, prior to the production of a cured product, the particle diameter may be adjusted according to the intended use, such as by grinding or granulation The resin composition of the present invention can be used for products requiring wear resistance and can be suitably used particularly for friction materials, such as brake pads, brake linings, and clutch facings. For example, when the resin composition of the present invention is used for a brake pad, a formed body of a friction material can be produced by mixing an abrasive material, a lubricant, organic dust, metal, a filler, a thermosetting resin, and a hardener into the resin composition of the present invention, forming the mixture into a shape at a predetermined pressure and normal temperature, then thermoforming the formed mixture at a predetermined temperature, and then subjecting the formed mixture to thermal treatment and finishing.

EXAMPLES

The present invention will be described below in further detail with reference to specific examples. The present invention is not at all limited by the following examples and modifications and variations may be appropriately made therein without changing the gist of the invention. The alkaline elution rate and the aqueous dispersion pH were evaluated according to the following methods.

<Alkaline Elution Rate>

The mass (X) of a titanate compound was measured, the titanate compound was then added to distilled water to prepare a 1% by mass slurry, the slurry was stirred at 80° C. for four hours, and a solid was then removed from the slurry with a membrane filter having a pore size of 0.2 μm to obtain an extraction liquid. The total mass (Y) of alkali metal and alkaline earth metal in the obtained extraction liquid was measured with an ion chromatograph (ICS-1100 manufactured by Dionex Corporation). Then, the alkaline elution rate was calculated based on the formula [(Y)/(X)]×100 using the masses (X) and (Y).

<Aqueous Dispersion pH>

An amount of 1 g of a titanate compound was added to 100 mL of distilled water to prepare a 1% by mass slurry and the pH of the obtained slurry (at 20° C.) was measured with a pH meter (F21 manufactured by Horiba, Ltd.) to calculate an aqueous dispersion pH.

<Production of Resin Composition>

Example 1

An amount of 150 parts by mass of phenol and 71 parts by mass of 37% formalin were introduced into a reaction vessel with a cooler and a stirrer and 2 parts by mass of oxalic dihydrate was then introduced into the reaction vessel. The reaction vessel was gradually raised in temperature and, after the temperature hit 95° C., the contents were reacted at reflux for 180 minutes. Then, the contents underwent a dehydration reaction under a reduced pressure of 30 Torr and were raised in temperature to 150° C. Thereafter, 200 parts by mass of a titanate compound shown in Table 1 was added to the contents, followed by homogeneous stirring. Subsequently, the mixture was withdrawn from the reaction vessel, solidified at normal temperature, and ground in a mortar, thus obtaining a resin composition made of 138 g of a novolac-type phenolic resin and 199 g of the titanate compound. An amount of 14 parts by mass of hexamethylene tetramine serving as a hardener was added to 337 parts by mass of the obtained resin composition and the mixture was ground again in a mortar to obtain a resin composition for a friction material.

Example 2 to Example 7

Resin compositions for friction materials were obtained in the same manner as in Example 1 except that the above titanate compound was changed to their respective titanate compounds shown in Table 1.

Comparative Example 1

An amount of 150 parts by mass of phenol and 71 parts by mass of 37% formalin were introduced into a reaction vessel with a cooler and a stirrer and 2 parts by mass of oxalic dihydrate was then introduced into the reaction vessel. The reaction vessel was gradually raised in temperature and, after the temperature hit 95° C., the contents were reacted at reflux for 180 minutes. Then, the contents underwent a dehydration reaction under a reduced pressure of 30 Torr and were raised in temperature to 150° C. Subsequently, the mixture was withdrawn from the reaction vessel, solidified at normal temperature, and ground in a mortar, thus obtaining 141 g of a novolac-type phenolic resin. Subsequently, 14 parts by mass of hexamethylene tetramine was added to 141 parts by mass of the novolac-type phenolic resin and the mixture was ground in a mortar. Thereafter, 200 parts by mass of a titanate compound shown in Table 1 was added to the mixture, followed by grinding again in a mortar.

Comparative Example 2 to Comparative Example 7

Resin compositions for friction materials were obtained in the same manner as in Comparative Example 1 except that the above titanate compound was changed to their respective titanate compounds shown in Table 1.

<Production of Friction Material>

An amount of 8 parts by mass of a mixture of aramid pulp and friction dust, 28 parts by mass of barium sulfate, 26 parts by mass of an inorganic filler, and 6 parts by mass of graphite were blended into 27 parts by mass of the resin composition for a friction material obtained in Example 1, the blended material was mixed with a Lodige mixer, and the obtained mixture was preliminarily formed (at 25 MPa), thermoformed (at 150° C. and 20 MPa), and further subjected to a thermal treatment (at 160 to 210° C.) to produce a pad for a disc brake. This pad for a disc brake is one having a shape shown in FIG. 20-152 (No. 152-4) of JIS D0107 and a friction material for use in a disc brake system.

Also in Examples 2 to 7 and Comparative Examples 1 to 7, friction materials were produced in the same manner as in Example 1.

The friction material of Comparative Example 7 produced protuberances.

<Evaluation of Friction Material>

The porosity of the friction material was measured based on JIS D4418. The amount of wear of the friction material was measured in conformity to JASO C427 and using a dynamometer. The appearance of the friction material after being subjected to friction was evaluated by considering the friction surface of the friction material obtained in Comparative Example 2 as the normal signified by a circle, making comparisons with the other friction materials in terms of the degree of cracks and the degree of whitening, and assigning grades double circle, circle, triangle, cross, and double cross in order of condition from better to worse. The results are shown in Table 1.

TABLE 1

| | TITANATE COMPOUND USED FOR PRODUCTION | | | | | FRICTION MATERIAL PROPERTIES | | | | | |
|---|---|---|---|---|---|---|---|---|---|---|---|
| | | | AVERAGE PARTICLE SIZE | ALKALINE ELUTION RATE (% | AQUEOUS DISPERSION | POROSITY | AMOUNT OF WEAR (mm/1000 cycles) | | | | APPEARANCE AFTER FRICTION |
| | COMPONENT | FORM | (μm) | by mass) | pH | (%) | 100° C. | 200° C. | 300° C. | 400° C. | |
| Ex. 1 | Sodium Hexatitanate (Composition Formula: $Na_2O \cdot 6TiO_2$) | Granular | 6 | 0.1 | 9.7 | 13.0 | 0.21 | 0.16 | 0.40 | 0.40 | ◎ |
| Ex. 2 | Potassium Octatitanate (Composition Formula: $K_2O \cdot 8TiO_2$) | Platy | 8 | 0.2 | 9.4 | 12.2 | 0.19 | 0.14 | 0.40 | 0.35 | ◎ |
| Ex. 3 | Potassium Hexatitanate (Composition Formula: $K_2O \cdot 6TiO_2$) | Irregular | 20 | 0.2 | 9.4 | 13.0 | 0.21 | 0.15 | 0.42 | 0.35 | ◎ |
| Ex. 4 | Magnesium Potassium Titanate (Composition Formula: $K_{0.7}Mg_{0.4}Ti_{1.6}O_{3.95}$) | Platy | 7 | 2.7 | 10.8 | 10.9 | 0.18 | 0.14 | 0.40 | 0.28 | Δ |
| Ex. 5 | Lithium Potassium Titanate (Composition Formula: $K_{0.7}Li_{0.27}Ti_{1.73}O_{3.95}$) | Platy | 2 | 2.6 | 10.6 | 11.2 | 0.20 | 0.14 | 0.43 | 0.25 | Δ |

TABLE 1-continued

| | TITANATE COMPOUND USED FOR PRODUCTION | | | | | FRICTION MATERIAL PROPERTIES | | | | | |
|---|---|---|---|---|---|---|---|---|---|---|---|
| | COMPONENT | FORM | AVERAGE PARTICLE SIZE (μm) | ALKALINE ELUTION RATE (% by mass) | AQUEOUS DISPERSION pH | POROSITY (%) | AMOUNT OF WEAR (mm/1000 cycles) | | | | APPEARANCE AFTER FRICTION |
| | | | | | | | 100° C. | 200° C. | 300° C. | 400° C. | |
| Ex. 6 | Lithium Potassium Titanate (Composition Formula: $K_{0.7}Li_{0.27}Ti_{1.73}O_{3.95}$) | Platy | 17 | 2.7 | 10.6 | 10.7 | 0.17 | 0.14 | 0.42 | 0.30 | Δ |
| Ex. 7 | Potassium Tetratitanate (Composition Formula: $K_2O \cdot 4TiO_2$) | Acicular | Fiber diameter: 0.4, fiber length 3.0 | 4.7 | 11.6 | 15.5 | 0.30 | 0.45 | 0.70 | 1.20 | × |
| Comp. Ex. 1 | Sodium Hexatitanate (Composition Formula: $Na_2O \cdot 6TiO_2$) | Granular | 6 | 0.1 | 9.7 | 14.3 | 0.20 | 0.14 | 0.41 | 0.70 | ⊚ |
| Comp. Ex. 2 | Potassium Octatitanate (Composition Formula: $K_2O \cdot 8TiO_2$) | Platy | 8 | 0.2 | 9.4 | 12.4 | 0.18 | 0.10 | 0.42 | 0.58 | ○ |
| Comp. Ex. 3 | Potassium Hexatitanate (Composition Formula: $K_2O \cdot 6TiO_2$) | Irregular | 20 | 0.2 | 9.4 | 11.6 | 0.20 | 0.12 | 0.40 | 0.62 | ⊚ |
| Comp. Ex. 4 | Magnesium Potassium Titanate (Composition Formula: $K_{0.7}Mg_{0.4}Ti_{1.6}O_{3.95}$) | Platy | 7 | 2.7 | 10.8 | 8.1 | 0.18 | 0.12 | 0.40 | 0.33 | × |
| Comp. Ex. 5 | Lithium Potassium Titanate (Composition Formula: $K_{0.7}Li_{0.27}Ti_{1.73}O_{3.95}$) | Platy | 2 | 2.6 | 10.6 | 9.9 | 0.19 | 0.13 | 0.41 | 0.31 | × |
| Comp. Ex. 6 | Lithium Potassium Titanate (Composition Formula: $K_{0.7}Li_{0.27}Ti_{1.73}O_{3.95}$) | Platy | 17 | 2.7 | 10.6 | 9.2 | 0.16 | 0.12 | 0.40 | 0.31 | × |
| Comp. Ex. 7 | Potassium Tetratitanate (Composition Formula: $K_2O \cdot 4TiO_2$) | Acicular | Fiber diameter: 0.4, fiber length 3.0 | 4.7 | 11.6 | 16.2 | 0.30 | 0.50 | 0.90 | 1.50 | × × |

As indicated in Table 1, in Comparative Examples 4 to 6 in which titanate compounds having a relatively high alkaline elution rate were used, the friction materials exhibited good wear resistance but their porosities were low and their appearances after being subjected to friction were poor. In contrast, in Examples 4 to 6 in which the same titanate compounds as in Comparative Examples 4 to 6 were used, the friction materials exhibited good wear resistance, their porosities were high, and their appearances after being subjected to friction were improved. Furthermore, in Example 7, as compared to Comparative Example 7, the friction material exhibited better wear resistance and the appearance thereof after being subjected to friction was improved. The reasons for the above can be considered as follows.

In conventional cases, if a titanate compound having a high alkaline elution rate is used, the curing of phenolic resin is delayed to decrease the degree of three-dimensional cross-linking and decrease the matrix strength. Therefore, the surface of the friction material becomes brittle, which deteriorates the appearance of the friction material after being subjected to friction. Furthermore, since the curing of phenolic resin is delayed, the phenolic resin prior to curing easily flows during formation, thus decreasing the porosity. The present invention can reduce the influence of alkali eluted from the titanate compound. Therefore, the porosity can be increased to improve the appearance of the friction material after being subjected to friction.

It can be seen that in Examples 1 to 3 according to the present invention, the amount of wear was reduced as compared to the Comparative Examples 1 to 3. Particularly, the amount of wear at 400° C. was reduced. This can be attributed to the fact that the use of the resin composition according to the present invention can provide a uniform dispersion of the titanate compound in the resin composition and can prevent interference with the curing of the phenolic resin.

The invention claimed is:

1. A method for producing a resin composition, the method comprising the steps of:
   preparing the thermosetting resin in liquid form;
   mixing a titanate compound into the thermosetting resin in liquid form to disperse the titanate compound thereinto; and
   adding a hardener to the thermosetting resin composition containing the titanate compound.

2. The method for producing the resin composition according to claim 1, wherein the step of preparing the thermosetting resin in liquid form includes a step of liquefying the thermosetting resin by melting the thermosetting resin by application of heat.

3. A method for producing a friction material, the method comprising the steps of:
   producing a resin composition;
   adding a hardener to the resin composition, followed by grinding into a ground product;

preparing a composition for a friction material using the ground product; and thermoforming the composition for a friction material to produce a friction material, wherein the step of producing the resin composition comprises:

preparing the thermosetting resin in liquid form, and mixing the titanate compound into the thermosetting resin in liquid form to disperse the titanate compound thereinto.

4. The method for producing the resin composition according to claim 3, wherein the step of preparing the thermosetting resin in liquid form includes the step of liquefying the thermosetting resin by melting the thermosetting resin by application of heat.

5. The method for producing a friction material according to claim 3, wherein the titanate compound has an alkaline elution rate of 2% by mass or more.

6. The method for producing a friction material according to claim 3, wherein the titanate compound has an alkaline elution rate of less than 2% by mass.

7. The method for producing a friction material according to claim 3, wherein the titanate compound is a salt of at least one element selected from the group consisting of alkali metals and alkaline earth metals.

8. The method for producing a friction material according to claim 3, wherein the thermosetting resin is a phenolic resin.

9. The method for producing the resin composition according to claim 1, wherein the titanate compound has an alkaline elution rate of 2% by mass or more.

10. The method for producing the resin composition according to claim 1, wherein the titanate compound has an alkaline elution rate of less than 2% by mass.

11. The method for producing the resin composition according to claim 1, wherein the titanate compound is a salt of at least one element selected from the group consisting of alkali metals and alkaline earth metals.

12. The method for producing the resin composition according to claim 1, wherein the thermosetting resin is a phenolic resin.

* * * * *